US011410037B2

(12) United States Patent
Donatelli et al.

(10) Patent No.: US 11,410,037 B2
(45) Date of Patent: Aug. 9, 2022

(54) MODEL IMPROVEMENT USING FEDERATED LEARNING AND CANONICAL FEATURE MAPPING

(71) Applicant: International Business Machines Corporation, Armonk, NY (US)

(72) Inventors: Alessandro Donatelli, Rome (IT); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 17/122,298

(22) Filed: Dec. 15, 2020

(65) Prior Publication Data
US 2022/0188630 A1    Jun. 16, 2022

(51) Int. Cl.
*H04L 67/10* (2022.01)
*H04L 41/16* (2022.01)
*H04L 41/045* (2022.01)
*G06N 3/08* (2006.01)
*G06K 9/62* (2022.01)

(52) U.S. Cl.
CPC ............. *G06N 3/08* (2013.01); *G06K 9/6289* (2013.01); *G06K 9/6296* (2013.01); *H04L 67/10* (2013.01)

(58) Field of Classification Search
CPC ....... H04L 41/045; H04L 41/16; H04L 67/01; H04L 67/10
See application file for complete search history.

(56) References Cited

U.S. PATENT DOCUMENTS

| | | | |
|---|---|---|---|
| 2019/0012592 A1 | 1/2019 | Beser | |
| 2020/0218937 A1 | 7/2020 | Visentini Scarzanella | |
| 2020/0326684 A1* | 10/2020 | Chand | G05B 19/4155 |

(Continued)

FOREIGN PATENT DOCUMENTS

| | | | | |
|---|---|---|---|---|
| CN | 104966141 B | * | 9/2020 | ......... G06F 17/5009 |
| EP | 3726320 A1 | * | 10/2020 | ......... G05B 19/0426 |

(Continued)

OTHER PUBLICATIONS

Haddadpour et al., "On the convergence of local descent methods in federated learning", arXiv preprint arXiv:1910.14425, Dec. 6, 2019, 49 pps.

(Continued)

*Primary Examiner* — Kostas J Katsikis
(74) *Attorney, Agent, or Firm* — David K. Mattheis; Maeve Carpenter

(57) ABSTRACT

The method provides for receiving a plurality of trained models from a corresponding plurality of clients, wherein a respective trained model predicts a condition of an asset and is based on a data set associated with the asset of a respective client. The trained model is based on a seed model that includes a canonical set of features. The trained model includes a component that converts the data at a site to the canonical set of features used by the seed model. The plurality of trained models from the corresponding plurality of clients is assigned to two or more groupings, wherein a grouping includes trained models providing similar analysis. The one or more processors generate an improved model for a client with a limited amount of training data, obtaining the improvement by using multiple models that belong to the same grouping of the first client's model.

20 Claims, 5 Drawing Sheets

(56) References Cited

U.S. PATENT DOCUMENTS

| | | | |
|---|---|---|---|
| 2021/0096551 A1* | 4/2021 | Sayyarrodsari | G06F 11/00 |
| 2021/0397166 A1* | 12/2021 | Sayyarrodsari | G05B 19/056 |
| 2021/0397171 A1* | 12/2021 | Sayyarrodsari | G05B 19/4183 |
| 2022/0036178 A1* | 2/2022 | Dimitriadis | G06N 3/0454 |
| 2022/0043431 A1* | 2/2022 | Sayyarrodsari | G05B 19/41835 |

FOREIGN PATENT DOCUMENTS

| | | | |
|---|---|---|---|
| EP | 3522322 B1 * | 2/2021 | G05B 13/042 |
| EP | 3798776 A1 * | 3/2021 | G06F 17/16 |
| EP | 3798942 A1 * | 3/2021 | G05B 19/4183 |
| EP | 3798947 A1 * | 3/2021 | G05B 19/4183 |

OTHER PUBLICATIONS

Hardy et al., "Private federated learning on vertically partitioned data via entity resolution and additively homomorphic encryption", arXiv preprint arXiv:1711.10677, Nov. 29, 2017, 60 pps.

Nilsson et al., "A performance evaluation of federated learning algorithms"; Proceedings of the Second Workshop on Distributed Infrastructures for Deep Learning, pp. 1-8. 2018.

Verma et al., "Federated AI for building solutions across multiple agencies", Downloaded from the Internet on Dec. 11, 2020, arXiv preprint arXiv:1809.10036, 7 pps., <www.arxiv.org/abs/1809.10036>.

Verma et al., "Federated AI for the Enterprise: A Web Services Based Implementation", 2019 IEEE International Conference on Web Services (ICWS), IEEE, Dwonloaded on Jul. 30, 2020, 8 pps.

Verma et al., "Federated Learning for Coalition Operations", arXiv preprint arXiv:1910.06799, Oct. 14, 2019, 8 pps.

Verma et al., "Policy based Ensembles for applying ML on Big Data", 2019 IEEE International Conference on Big Data (Big Data), pp. 4038-4044.

Wu et al., "Galaxy Learning—A Position Paper", May 3, 2019, 8 pps., arXiv preprint arXiv:1905.00753.

Yang et al., "Federated Machine Learning: Concept and Applications," arXiv:1902.04885v1 [cs.AI], Feb. 13, 2019, 19 pps.

* cited by examiner

FEATURE SCHEMA MISMATCH

MODEL IMPROVEMENT USING FEDERATED LEARNING AND CANONICAL FEATURE MAPPING

FIELD OF THE INVENTION

The present invention relates generally to the field of analytical modeling, and more particularly to developing an aggregate artificial intelligence model based on multiple protected data sets.

BACKGROUND OF THE INVENTION

Businesses and organizations apply assets to perform functions or services towards a purpose or activity and resources directed towards the purpose. For example, utilities have generators as assets that produce electrical power that is supplied to customers. Robotic assembly equipment may be assets used by businesses assembling finished products. In general, assets can be equipment, hardware, software, or methods to which data measurements can be made and metrics can be applied.

Asset management applications and systems are often employed to ensure the effectiveness, reliability, and longevity of assets in the performance of intended functions. Asset management sometimes includes modeling of the function and effectiveness of assets to better predict potential failure, interruption, or loss of effectiveness, and avoid asset downtime by scheduling preventative measures.

Artificial Intelligence (AI) modeling can be performed by applying unsupervised and/or supervised learning techniques and is based on available data to build and train the model for accuracy. Typically, large amounts of data are used to train AI models. Asset data is often manually generated, especially data pertaining to the condition or state assessment of the asset. Manually generated data results in relatively slow data growth, and businesses and organizations often consider the asset data to be confidential or proprietary.

SUMMARY

Embodiments of the present invention disclose a method, computer program product, and system for generating an improved artificial intelligence (AI) model. The method provides for one or more processors to receive respective models and information regarding a type of the respective models from a plurality of clients. The one or more processors group respective existing models from the plurality of clients into one or more domains in which a domain includes similar types of AI models. The one or more processors send a seed model to a first set of clients of the plurality of clients, respectively, that have existing models grouped in a first domain. The one or more processors receive confirmation of mapping feature data of the respective existing models of the first set of clients to canonical inputs of the seed model. The one or more processors send a base model with the canonical features associated with the seed model, respectively, to the first set of clients. The one or more processors receive from the first set of clients, respectively, the base model in which respective base models are trained by the feature data of the existing models of the respective clients. The one or more processors generate an augmented model by a combination of data from the received plurality of base models, trained by the feature data of the respective existing models of the first set of clients, and the one or more processors prepending data transformations of the respective models to the single aggregate model.

Embodiments of the present invention also disclose a method, computer program product, and system for improving a particular type of model based on augmenting a plurality of models trained on private feature data. The method provides for one or more processors of a client computing device to receive a domain assignment for an existing model of a model type. The one or more processors receive a seed model that includes canonical features as inputs to the seed model, and at least one output associated with the existing model of the model type. The one or more processors train the seed model by generating a feature mapper that maps the private feature data of the existing model to the canonical features of the seed model. The one or more processors confirm completion of the mapping of the private feature data of the existing model to the canonical features of the seed model. The one or more processors receive a base model including the canonical features of the seed model. The one or more processors train the base model by applying the private feature data of the existing model to the canonical features of inputs by use of the feature mapper. The one or more processors send the base model that is trained to a model augmentation service, wherein the model augmentation service applies federated learning to a plurality of received based models, respectively trained by applying the private feature data of respective existing models to the canonical features of the received base models by use of respective feature mappers, and the one or more processors prepend the feature mapper to an augmented base model received from the model augmentation service and apply the private feature data of the existing model to the feature mapper.

DETAILED DESCRIPTION

Figure 1:
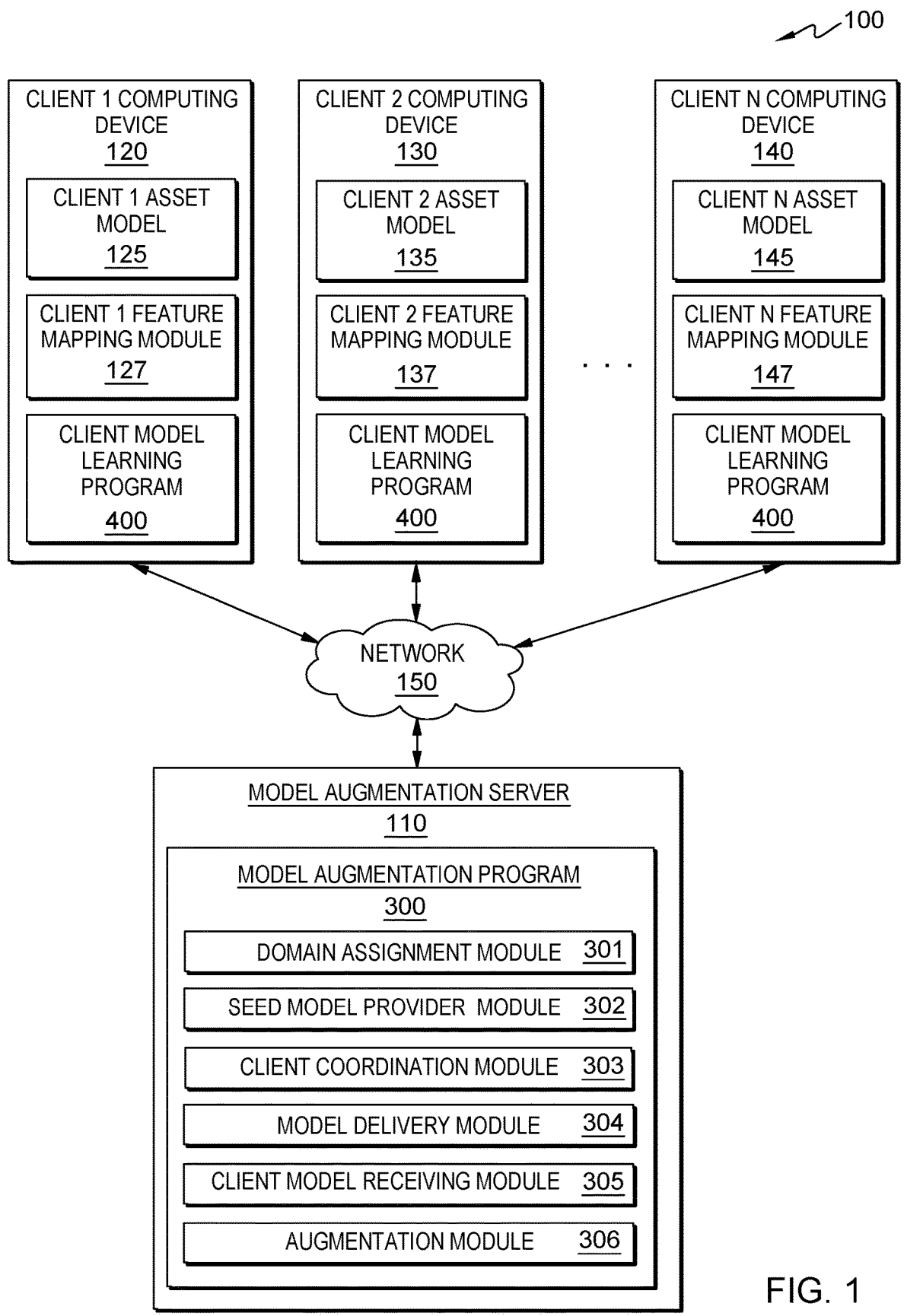
FIG. 1 is a functional block diagram illustrating a distributed data processing environment, in accordance with an embodiment of the present invention.

Embodiments of the present invention recognize that asset management systems are used to track, manage, and maintain assets, such as manufacturing equipment, power generators, pumps, robotics, and in some cases electronics, for example. Asset owners, as well as other users of models providing analytical output, can benefit from artificial intelligence (AI) models. AI models of assets can predict the condition or state of the asset or component of the asset, based on data measurements of certain features of the asset. Embodiments of the present invention recognize that large amounts of data are typically used to train AI models and the amount of data collected may accumulate slowly and individual asset owners may not have adequate quantities of data to train a more accurate model. This situation can arise for assets in which the asset's state update is input manually, or for assets in which the state update is collected by automated means, but the collection interval and collection rates are low. Another related issue is that businesses and organizations often consider asset data to be confidential or proprietary and are not willing to share private raw asset data with other businesses or organizations.

Embodiments also recognize that AI models are more accurate when the models are trained on a larger quantity of data of respective assets' states and conditions through time. Given the lack of large volumes of applicable feature data and asset state results, existing AI model prediction accuracy can fall well below highly reliable levels. Embodiments also recognize that asset owners, referred to herein as "clients," often consider the data associated with features of assets to be proprietary or for internal use only, also referred to as private and therefore sharing feature data of similar assets between clients to improve AI model accuracy is avoided. Even if the protective behavior of asset data were overcome, sharing of asset feature data would remain problematic because individual clients may rely on disparate features of assets or use different schemas of features as input to the respective client's AI models, making the data difficult or impossible to share or consolidate. It is noted that embodiments of the present invention can be applied to improve AI models other than those used in conjunction with asset management; however, embodiments will be discussed, herein, with respect to AI models of assets as an embodiment example to clarify the features and details of embodiments, but without limitation of embodiments of the present invention to asset model applications.

Embodiments of the present invention provide a method, computer program product, and computer system for improving the effectiveness and accuracy of a model by federating a plurality of client models without sharing feature data. Embodiments use a client-server model where a set of clients communicate with a server providing model augmentation services to improve the respective client models. Embodiments use a seed model to generate and train a feature mapper to map the features of each respective client's asset model to a set of canonical features included in a canonical schema. The feature mapper of each client is trained on local feature data to attain the most accurate output for the seed model, which indicates an effective mapping of client features to the canonical features. Alternatively, some embodiments use a feature mapper that is defined using a set of policies or rules to map features to the input of the seed model.

Embodiments may define the set of policies or rules at the model augmentation server or at each client. The plurality of client asset models are grouped by domain, in which a domain includes models that are similar in nature (i.e. the models are used for similar or identical functions or are trained for similar types of assets). Each domain has a seed model which consists of a predefined set of canonical inputs and canonical outputs. The seed model can be augmented to create a common model for each asset domain as more clients use the federation service. Each client of the asset group applies local feature data, which are mapped to the canonical inputs using the feature mapper of the client, to the common model.

The common models with mapped input are federated by the model augmentation service, generating an aggregate model, effectively the result of the combination of all of the clients' feature data, without the need for clients to share respective client data. The augmented model is distributed to the client members of the grouping of the asset class, and a client-side module prepends the feature mapper to the common model, producing an improved model customized to the respective client and resulting in a model with a more accurate and effective prediction of the output, such as the asset state or condition.

In embodiments of the present invention, a feature mapper for each respective client AI model is trained to map to the canonical classifier schema for an asset class (i.e., engine, pump, elevator), by applying a neural network with the feature data of the client asset as input, and the highest accuracy prediction level based on supervised learning using client asset data. The feature mapping is trained using a seed model received by the respective clients that include a higher-level, common set of canonical features, usually fewer than the number of input features. Each feature mapper for an asset of an asset class for a plurality of clients is trained on the local feature data of the client, which is mapped to the canonical schema of the seed model. In other embodiments, a domain ontology is used to determine and provide a set of rules for feature mapping to canonical inputs of a seed model. In some embodiments, a framework set of rules is provided and customized based on the unique features of respective client assets. The mapping of features to canonical inputs based on a customized rule set may include manual customizations.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 of FIG. 1 includes model augmentation server 110, and client 1 computing device 120, client 2 computing device 130, and client N computing device 140, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between model augmentation server 110, and client 1 computing device 120, client 2 computing device 130, and client N computing device 140.

Model augmentation server 110 includes model augmentation program 300, which is illustrated as including modules to better categorize the functions of model augmentation program 300. Model Augmentation server 110 includes domain assignment module 301, seed model provider module 302, client coordination module 303, model delivery module 304, client model receiving module 305, and augmentation module 306. In some embodiments, model augmentation server 110 can be a blade server, a web server, a laptop computer, a desktop computer, a standalone mobile computing device, a smartphone, a tablet computer, or another electronic device or computing system capable of receiving, sending, and processing data. In other embodiments, model augmentation server 110 may be a computing device interacting with applications and services hosted and operating in a cloud computing environment. In another embodiment, model augmentation server 110 can be a netbook computer, a personal digital assistant (PDA), or other programmable electronic devices capable of generating and transmitting to and receiving input from client 1 computing device 120, client 2 computing device 130, and intervening client computing devices up to and including client N computing device 140. Alternatively, in some embodiments, model augmentation server 110 may be communicatively connected to model augmentation program 300 operating remotely. Server 110 may include internal and external hardware components, depicted in more detail in FIG. 5.

Model augmentation program 300 is illustrated as an implementation embodiment that includes as components of model augmentation program 300, domain assignment module 301, seed model provider module 302, client coordination module 303, model delivery module 304, client model coordination module 305, and augmentation module 306. Model augmentation program 300 provides a canonical model to clients to which the feature mapping is applied to canonical inputs to produce a prediction result for the particular class of asset. Model augmentation program 300 augments the model of a client using models from the plurality of clients within a domain, generating a single aggregate model federated from all participating client models in the domain. The augmented model benefits from the aggregate feature input data from all clients in the domain without having to share feature data considered proprietary or for internal use by clients. Model augmentation program 300 delivers the aggregate model to one of the plurality of clients, and the respective clients apply the respective client's local feature data to the federated model and receive an improvement in accuracy and effectiveness of the prediction output.

Domain assignment module 301 is a component of the model augmentation program 300. Domain assignment module 301 determines the domain for each of the plurality of clients participating, based on input received from the client. A domain consists of a group of models that produce the same type of output decision from the respective models. A client may have a plurality of models, each model belonging to a specific domain. Domain assignment module 301 identifies and groups client models into a domain, based on the type or class of the asset and the type of function for which the model is being used for the asset. For example, domain assignment module 301 groups clients creating models to check on error status of electrical motors into a domain, and groups clients creating models to determine if drilling equipment and robotic assembly equipment need service maintenance in another domain.

Seed model provider module 302 is a component of model augmentation program 300. Seed model delivery module 302 provides participating clients with a seed model, which is used in some embodiments by the respective client to create and train a feature mapper that maps local feature data to canonical input features of the seed model. In some embodiments, the seed model is a generic model that includes an output result that matches or is similar to an existing output of the client's current model.

Client coordination module 303 is a component of model augmentation program 300. The client coordination module 303 provides a mechanism by which model augmentation server 110 can pause until the respective clients perform the task of training a feature mapper to map the respective client's input data to the canonical seed model. In some embodiments, client coordination module 303 receives a training complete indication from the respective clients (i.e., client 1 computing device 120, client 2 computing device 130, client N computing device 140). In some embodiments, client coordination module 303 provides a set of rules to each client providing them a mechanism to perform feature mapping.

Model delivery module 304 is a component of model augmentation program 300. In some embodiments, subsequent to a client completing the training of a feature mapper to the seed model, the seed model is discarded and model delivery module 304 provides a base model to the client that includes a set of input canonical features to which the client has trained the feature mapper, and at least one canonical output that predicts a condition or event based on the received input. Each respective client within a domain receives the same base model from model delivery module 304. In some embodiments, the base model provided by model delivery module 304 is based on the asset type or asset class of the respective client. In some embodiments, the base model provided by model delivery module 304 is the same as the seed model provided by the seed model provider module 302.

Client model receiving module 305 is a component of model augmentation program 300. Client model receiving module 305 provides a mechanism by which model augmentation server 110 remains in standby and "listen" mode, while clients perform the task of training the base model provided by model delivery module 304. In some embodiments, the client model receiving module 305 stands-by to receive a training completion indication from the respective clients. In some embodiments, client model receiving module 305 determines a time-out duration while in standby mode and checks whether a communication from respective clients has been received, indicating the client base model training has been completed. In some embodiments, client model receiving module 305 pauses for manual delivery of a trained model to be received or incorporated as a step of a business process automation procedure within the organization.

Augmentation module 306 is a component of model augmentation program 300. Augmentation module 306 improves upon the trained model received from the client. In some embodiments, a plurality of clients use augmentation module 380 concurrently (i.e., within a relative range of time), augmentation module 306 receives models trained on local data from each participating client of a domain, and employs techniques to combine all the models into a federated model. A federated model combines information from multiple models by amalgamating multiple models into a single model or importing a model into another model. In some embodiments, the federated model can be created by repeatedly averaging the weights of a model in which the model is a neural network. The algorithm, as well as others, are described in the publication "A performance evaluation of federated learning algorithms"; Nilsson, Adrian, Simon Smith, Gregor Ulm, Emil Gustaysson, and Mats Jirstrand. Proceedings of the Second Workshop on Distributed Infrastructures for Deep Learning, pp. 1-8. 2018.

In other embodiments, augmentation module 306 improves upon the respective trained models provided by a plurality of clients, working with one client at a time, augmenting the model obtained from the client by using previously received models of the same domain provided by clients that have worked with model augmentation server 110 in the past. The generation of an augmented model by use of the trained weights of respective models from a plurality of clients leaves clients' feature data safe and unshared while providing a higher quality model. In some embodiments, augmentation module 306 creates an augmented model by generating a policy-based ensemble of all the client models it has encountered earlier. The algorithm for creating a policy-based ensemble is described in the publication "Policy based Ensembles for applying ML on Big Data."; Verma, D., S. Cabo, Elisa Bertino, Alessandra Russo, and Graham White, 2019 IEEE International Conference on Big Data (Big Data), pp. 4038-4044.

Client 1 computing device 120, client 2 computing device 130, and client N computing device 140 are a representation of a plurality of client computing devices that include local models to predict events of respective assets of client 1, client 2, and additional clients up to client N. Client 1 computing device 120, client 2 computing device 130 and client N computing device 140 are capable of performing programmable operations and communicating with other devices of distributed data processing environment 100. Client 1 computing device 120, includes client 1 asset model 125 and client 1 feature mapping module 127, client 2 computing device 130, includes client 2 asset model 135 and client 2 feature mapping module 137, and client N computing device 140 includes client N asset model 145 and client 3 feature mapping module 147. Client 1 computing device 120, client 2 computing device 130, and client N computing device 140 communicate via network 150 with model augmentation server 110.

In some embodiments, each or a combination of client 1 computing device 120, client 2 computing device 130, and client N computing device 140 may be a server computer, a laptop computer, a tablet computer, a smartphone, smartwatch, a wearable computing device, or any programmable electronic mobile device capable of communicating with various components and devices within distributed data processing environment 100, via network 150. In another embodiment, each or a combination of client 1 computing device 120, client 2 computing device 130, and client N computing device 140 may represent a computing system utilizing clustered computers and components (e.g., database server computers, application server computers, etc.) that act as a single pool of seamless resources when accessed within distributed data processing environment 100. In general, client 1 computing device 120, client 2 computing device 130, and client N computing device 140 represent one or more programmable electronic devices or a combination of programmable electronic devices capable of executing machine-readable program instructions and communicating with model augmentation server 110, via network 150. Client 1 computing device 120, client 2 computing device 130, and client N computing device 140 may include internal and external hardware components, depicted in more detail in FIG. 5.

Client 1 asset model 125, client 2 asset model 135, and client N asset model 145 are respective models for a class of asset for client 1, client 2, and intervening clients up to and including client N. Client 1 asset model 125, client 2 asset model 135, and client N asset model 145 are existing models for an asset operated by the respective client. The assets associated with client 1 asset model 125, client 2 asset model 135, and client N asset model 145 are of the same or similar asset type, such as a particular piece of manufacturing equipment. Client 1 asset model 125, client 2 asset model 135, and client N asset model 145 each have feature data used as inputs to produce a similar predictive output for the same asset type. However, the features used as inputs to the respective client models are not the same and may use different schemas. Client 1 asset model 125, client 2 asset model 135, and client N asset model 145 have been built and trained by using the limited quantities of feature data available respectively to client 1, client 2, and client N. The accuracy and effectiveness of client 1 asset model 125, client 2 asset model 135, and client N asset model 145 may be limited due to the lack of large amounts of data available to individual client models to achieve improved results.

Client 1 feature mapping module 127, client 2 feature mapping module 137, and client 3 feature mapping module 147 are depicted as components for client 1, client 2, and intervening clients up to and including client N. Feature mapping modules 127, 137, and 147 are used by client 1 computing device 120, client 2 computing device 130, and intervening clients up to and including client N computing device 140, respectively, to generate and train a feature mapper that maps local data of various features of the asset of the client that are tracked or recorded to a set of canonical input features of a seed model provided by model delivery module 302. The respective feature mapping modules 127, 137, and 147 provide a schema transformation service enabling clients to generate rules mapping local client data into canonical input formats compatible with the received seed model.

Figure 2A:
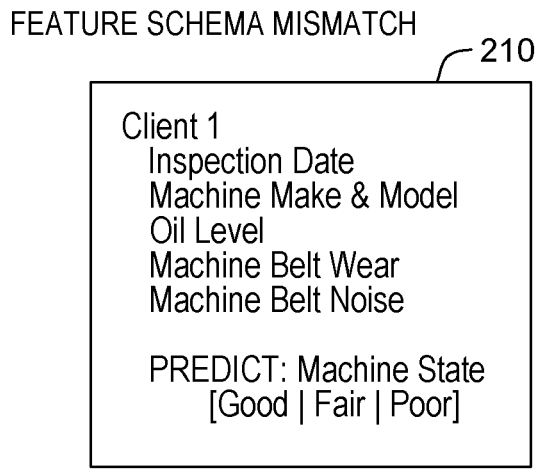
FIG. 2A is an example listing of features of asset models of two clients, in accordance with embodiments of the present invention.
Figure 2A:
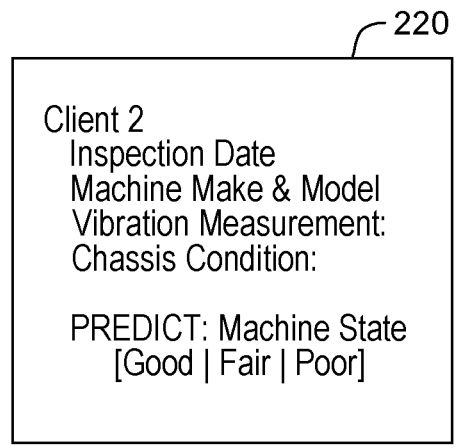

FIG. 2A depicts an example listing of a feature schema of two assets operated by two separate clients, in accordance with embodiments of the present invention. FIG. 2 includes client 1 asset features 210 and client 2 asset features 220. Client 1 asset features 210 uses a schema that includes the features: inspection date, machine make & model, oil level, machine belt wear, and machine belt noise. Client 1 asset features 210 includes a model output predicting the machine state, depicting three relative possible states of good, fair, and poor.

Client 2 asset features 220 uses a schema that includes the features: inspection date, machine make & model, vibration measurement, and chassis condition. Client 2 asset features 220 includes a model output predicting the machine state, depicting three relative possible states of good, fair, and poor. Client 1 asset features 210 and client 2 asset features 220 have some features in common, but also include different features, making the two schemas for the feature data used in the respective models incompatible, which prevents the use of the combined sets of feature data to improve the accuracy of either model.

Figure 2B:
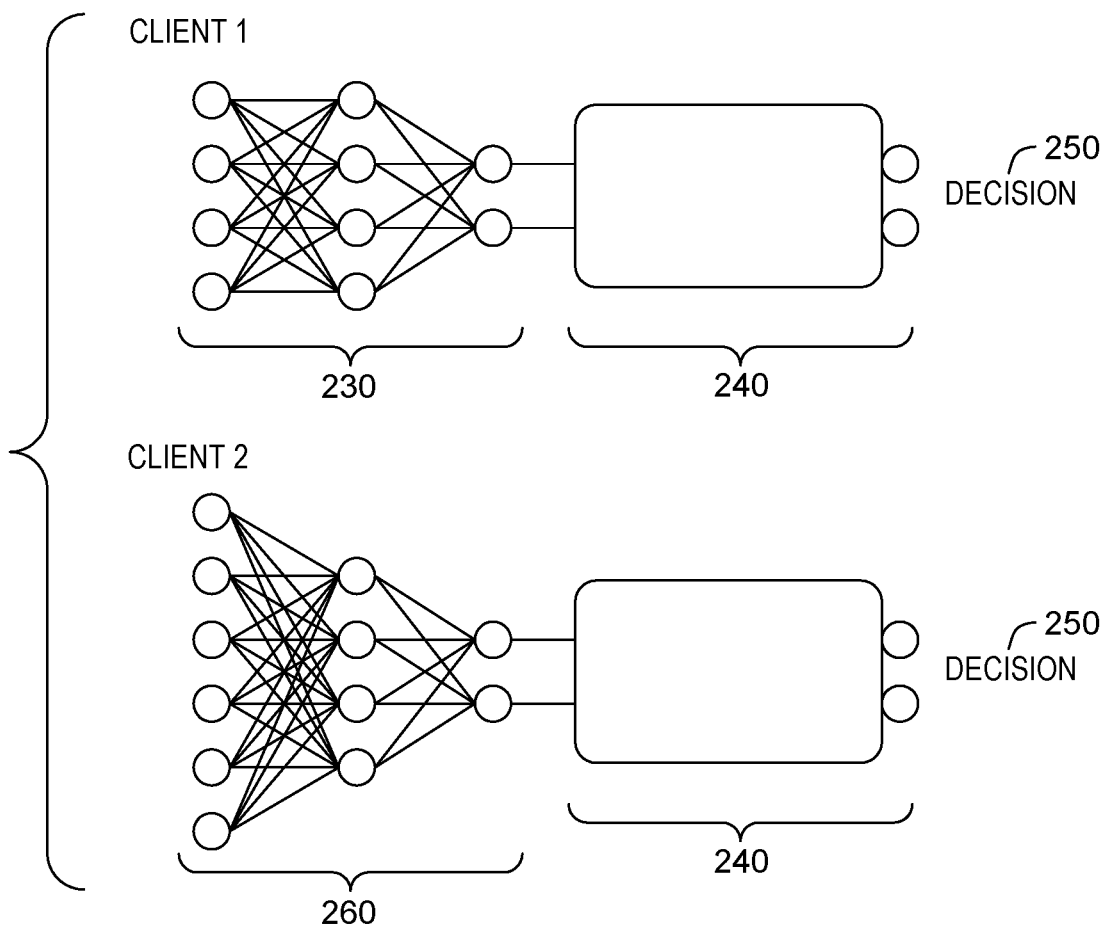
FIG. 2B illustrates an example feature mapper neural network, in accordance with embodiments of the present invention.

FIG. 2B depicts an example of applying a neural network for feature mapping of two assets operated by two separate clients, in accordance with embodiments of the present invention. FIG. 2B includes feature mapper 230, seed model 240, and decision output 250 for an asset of client 1, and feature mapper 260, seed model 240, and decision output 250 for an asset of client 2. Feature mapper 230 corresponds, respectively, to client 1 feature mapping module 127, client 2 feature mapping module 137, and client N feature mapping module 147 of FIG. 1. Feature mapper 230 for the asset of client 1 includes data input of four features. Feature mapper 230 illustrates the use of neural network layers that includes an input layer, a hidden layer, and an output layer, as an example. In the depicted example, feature mapper 230 maps the four input features to two canonical features as input to seed model 240. Seed model 249 processes the input feature data and produces a decision output, which could be, for example, a machine state of "good", "fair", or "poor".

Feature mapper 260 maps features of the asset of client 2 to canonical input features of seed model 240, performing a translation of local feature data to seed model 240 canonical features. Feature mapper 260 includes six input features to the input layer of a neural network that maps the input features to the two canonical input features of seed model 240. Seed model 240 includes decision output 250. FIG. 2B further illustrates the mapping of a varying number of client features to a fixed number of canonical features, which enables the independent raw feature data of assets for client 1 and client 2 to be mapped to the same canonical input features without sharing or exchanging feature data. Feature mapper 230 and feature mapper 260 enable a common use of a base model that includes the canonical feature input for assets of both client 1 and client 2.

Figure 3:
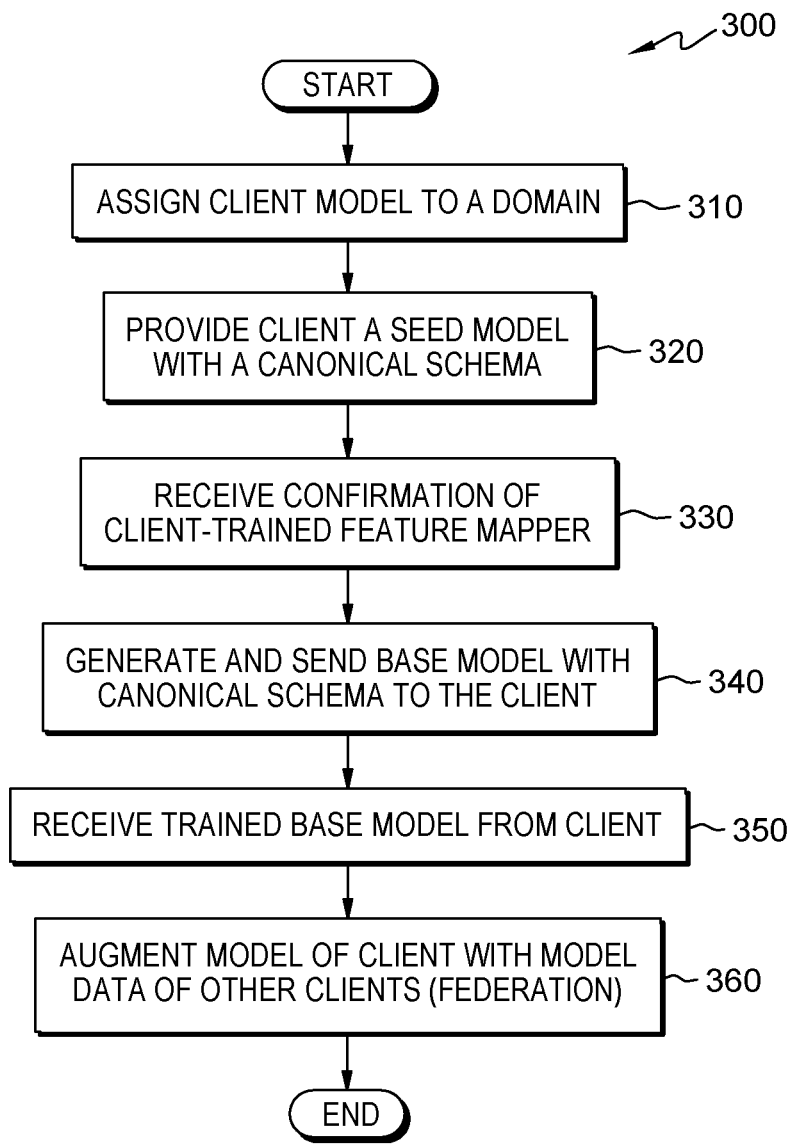
FIG. 3 is a flowchart depicting the operational steps of a model augmentation program operating in the server component of the distributed data processing environment of FIG. 1, in accordance with embodiments of the present invention.

FIG. 3 is a flowchart depicting the operational steps of model augmentation program 300, operating within the distributed processing environment of FIG. 1, in accordance with embodiments of the present invention. The module components of model augmentation program 300 are depicted in FIG. 1 to better illustrate the operational functions of model augmentation program 300. The description of FIG. 3 will address the overall operational steps without depicting modular components. In some embodiments, model augmentation program 300 may be included as part of an asset management application, system, or service. In other embodiments, model augmentation program 300 may be communicatively connected to an asset management system but operate independently.

Model augmentation program 300 assigns client models to a domain consisting of a grouping of a similar asset type (step 310). Model augmentation program 300 determines the domain of each respective client's asset that is received from a plurality of participating clients and assigns the asset models into groupings that provide the same type of asset analysis. The asset models in a domain share similar canonical input features and output features. Model augmentation program 300 maintains a seed model for each domain.

Model augmentation program 300 provides to the client a seed model that includes a canonical schema (step 320). Model augmentation program 300 sends a seed model to clients that model asset operations to predict events or activity of the asset. In some embodiments, the schemas of client model features will vary. The variation is often observed even among similar assets or of the same asset type. The seed model is sent to a plurality of clients participating in the federation of models to improve the overall accuracy and effectiveness of the models used to predict events or activities associated with the respective assets. The seed model schema provides a consistent set of canonical inputs to which the client model features, that may vary, are mapped.

For example, client 1 and client 2 both receive a seed model from model augmentation program 300. The seed model is the same for both clients and includes a common schema and a fixed set of input features, referred to as canonical features or canonical inputs. The seed model is used by the plurality of clients to train a feature mapper to map the respective feature data of the plurality of clients to the canonical input features of the seed model, which is described in FIG. 4.

Model augmentation program 300 receives confirmation of client training of feature mapper (step 330). Model augmentation program 300 remains in standby and "listen" mode, while respective clients perform the task of training the received seed model. While in a paused listening mode, model augmentation program 300 receives a message indicating a respective client has completed training of a feature mapper that maps the existing private feature data of the respective client's asset to the canonical inputs of the seed model and optimizing the resulting seed model output. In some embodiments, model augmentation program 300 determines a time-out duration while in standby mode and communicates with a respective client whether feature mapper training is complete. In some embodiments, mode augmentation program 300 receives manual input confirming completion of feature mapper training from a respective client communicating indirectly or incorporated as a step of a business process automation procedure within the organization. In some embodiments, the completion of feature mapper training may require the client to train its feature mapper to provide the best mapping from its existing feature data to the input features of the canonical model as described in FIG. 2. In other embodiments, the completion of feature mapper training may require the client to install rules to map its feature data to the set of canonical features.

For example, client A has received a seed model from model augmentation program 300 and has received a framework of a neural network to front-end the seed model. The seed model provided by model augmentation program 300 is used by client 1 to develop and train a feature mapper for client 1's asset feature to map to a set of canonical features of the received seed model. Model augmentation program 300 remains in a listen or standby mode until the respective client of the plurality of clients communicates that the training of the feature mapper has been completed. Model augmentation program 300 includes with the seed model a fixed number of canonical inputs that are usually fewer in number than the number of features used by client 1 for the client 1 asset's current model. The seed model includes an output that matches or is consistent with the output of client A's current asset model grouping. Client 1 uses current and historic local feature data, to map the features of client 1's asset to the canonical inputs of the seed model and uses supervised or unsupervised learning techniques to attain an output accuracy as high as possible with feature mapping of the local data.

Model augmentation program 300 generates and sends a base model that includes the canonical schema to the client (step 340). Model augmentation program 300, sends to the respective clients participating in AI model improvement, a model framework that is generated or previously generated by model augmentation program 300. The model framework of the base model sent to the respective clients includes the canonical input features and output that are aligned with the respective client's asset type and used in the seed model for feature mapper generation and training.

The model provided by model augmentation program 300 includes canonical features to which the trained feature mapper of the client has been trained to map the respective client's existing private feature data to the canonical input features of the provided model. In some embodiments, model augmentation program 300 has existing model frameworks that include the same or similar architecture and canonical features developed from prior participating clients. In some embodiments, model augmentation program 300 can continually use and improve models by iterative federated learning from multiple iterations of distributing models of an asset type to a set of clients and aggregating the models, with client feature data applied, from a plurality of clients.

In some embodiments, model augmentation program 300 provides (in step 340) a seed model that has previously been generated and federated with a previous plurality of clients for a particular asset or asset type, and when trained with client historical feature data, may be adequate for modeling the client's asset using subsequent feature data, and provision of a second model may prove unnecessary.

Model augmentation program 300 receives the trained base model from the respective client (step 350). Model augmentation program 300 uses a standby, listening mode to detect the receipt of the base models from the respective clients, which have been trained on the existing private data of the respective clients. Each of the received trained models reflects the model attributes of the respective client by applying the local existing private feature data to the feature mapper that maps the respective client's feature data to the base model. Base model attributes can include the weights given to model variables and the hidden layers included in neural network models, for example. The base model is trained using the respective client's private feature data without sharing or surrendering the feature data. The feature mapper acts as a data transformation model, and the base model is a common analytical model across all clients, enabling federation of the models. Model augmentation program 300 receives the trained base models from the respective clients.

Model augmentation program 300 generates an aggregate model by federating models from a grouping of similar asset client models (step 360). Model augmentation program 300 receives the models of the similar client assets of a group and, using federated learning techniques, federates the plurality of models into a single aggregate model. The client asset models that are received by model augmentation program 300 have been trained by processing existing local client (i.e., private) asset feature data mapped to the canonical input features of the model by use of the feature mapper previously trained on the seed model by each respective client. The respective client asset models received by model augmentation program 300 reflect an output level of accuracy that is based solely on the respective feature data of the individual client assets. Model augmentation program 300 uses federated learning techniques to generate an amalgamation of the plurality of models, resulting in a model that reflects the higher level of quality that is attained by applying a model to a larger set of feature data, but in this case, without sharing or surrendering the respective sets of client feature data.

For example, model augmentation program 300 receives a plurality of models provided for the client assets of a grouping of asset types. The received models have processed client asset local feature data training the model on the local data, such that individual instance of the model reflect the output accuracy attained by the local feature data mapped to the canonical input features of the model. Model augmentation program 300 generates a single aggregate model by an amalgamation of the received models, based on applying federated learning techniques. Each received model includes updated parameters and weights based on the respective feature data of the respective client asset. Federating the parameters and weights based on techniques, such as federated averaging, results in a single aggregate model that has the machine learning accuracy of the combination of the respective feature data sets of multiple client assets without disclosing or sharing the feature data.

Having provided the augmented model to participating clients as an improved more accurate model. Model augmentation program 300 ends.

Figure 4:
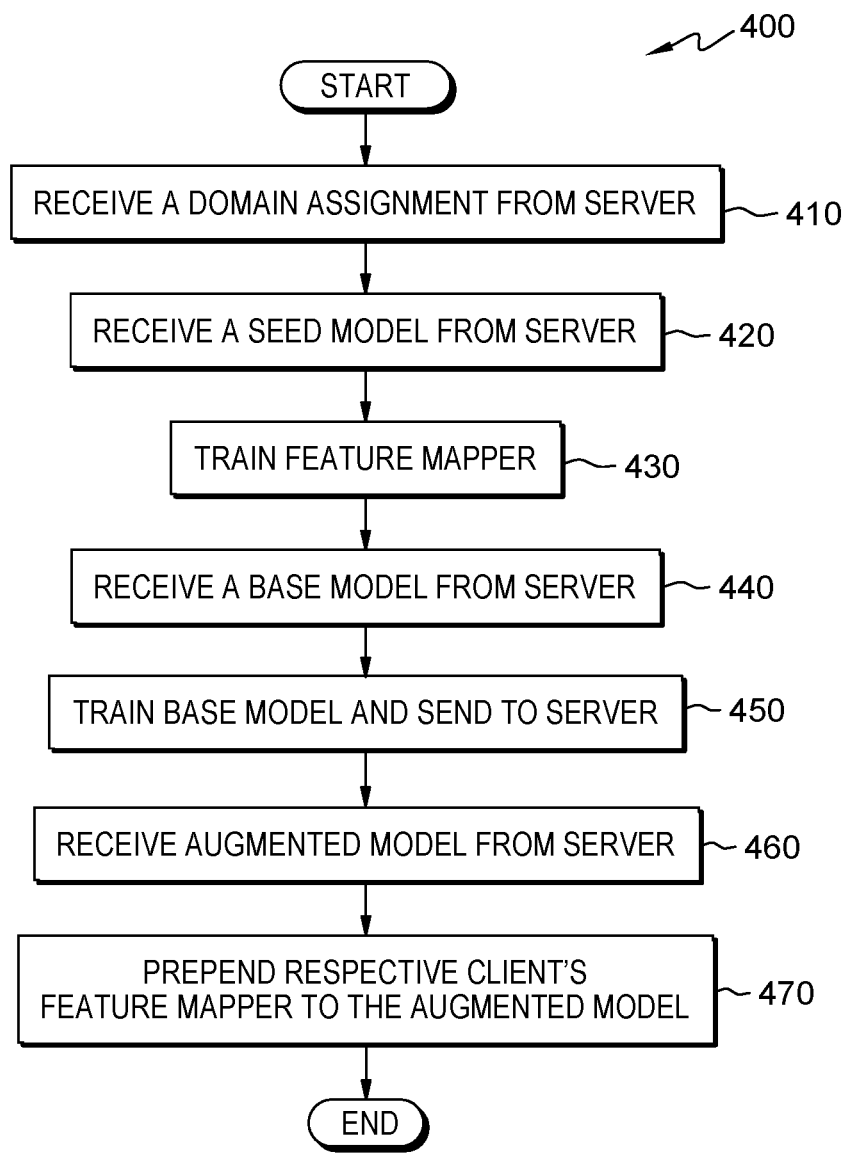
FIG. 4 is a flowchart depicting the operational steps of a client model learning program operating on client computing devices within the distributed data processing environment of FIG. 1, in accordance with embodiments of the present invention.

FIG. 4 a flowchart depicting the operational steps of client model learning program 400, operating in conjunction with model augmentation program 300, within the distributed processing environment of FIG. 1, in accordance with embodiments of the present invention. Client model learning program 400 runs in a coordinated manner with model augmentation program 300, but operating respectively on client 1 computing device 120, client 2 computing device 130, and intervening computing devices up to and including client N computing device 140 of FIG. 1. In some embodiments, client model learning program 400 may be included as part of an asset management application or system. In other embodiments, client model learning program 400 may be communicatively connected to an asset management system but operate independently.

Client model learning program 400 receives a domain assignment from the model augmentation server (step 410). In some embodiments, the received domain assignment may be based on the class of asset or the type of function being performed by the client's asset model which is being trained by use of the client's local data by client model learning program 400. In some embodiments, the domain assignment can be done by providing a configuration value to the client model learning program 400. The assigned domain for the client's asset enables defining a grouping of assets from which subsequent model augmentation can be performed.

Client model learning program 400 receives a seed model from the model augmentation server (step 420). In some embodiments, the seed model may provide for a model with canonical steps that the client model learning program will use within an AI model. In some embodiments, the seed model may consist of a set of rules which define how local client feature input data should be mapped to the canonical input of the seed model.

Client model learning program 400 trains a feature mapper (step 430). Client model learning program 400 enables the mapping of the features present in the local client input data to a set of canonical features of the seed model. In some embodiments, mapping local asset features to the canonical input features involves training an AI model which minimizes the error of the seed model. In some embodiments, a set of rules are included that provide the directions for converting input feature data into a set of canonical inputs for the seed model. Client model learning program 400 proceeds with training the AI model to minimize the output error of the seed model. Client model learning program 400 communicates with model augmentation program 300, operating on model augmentation server 110, confirming that client feature mapper training is complete (fulfilling step 330 of model augmentation program 300).

Client model learning program 400 receives a base model from the model augmentation server (step 440). Each client instance of client model learning program 400, participating in model augmentation (federation), receives a base model from model augmentation program 300 on model augmentation server 110. The model received may be untrained or partially trained depending on whether model augmentation server 110 previously interacted with client models within the same domain and asset type.

Client model learning program 400 trains the received base model and sends the trained model to the model augmentation server (step 450). The input data used for the training of the received model is obtained by running the local feature data available at the respective client through the feature mapper previously trained at the client in step 430. Subsequent to completing the training of the base model using local client feature data, client model learning program 400 sends the trained model to the augmentation server. The trained base model includes attributes generated by processing the local feature data of the respective clients' assets through the feature mapper as input to the received base model. Base model attributes can include the weights given to model variables and the hidden layers included in neural network models, for example. The feature mapper performing the unique transformation of local feature data of the respective client's asset to the canonical inputs of the base model, to attain a canonical output.

Client model learning program 400 receives an augmented model from the model augmentation server (step 460). The received augmented model is generated by model augmentation program 300 and includes applying federated learning techniques to a plurality of client models, which has the effect of training the respective client model using a significantly larger data set without the requirement of respective clients sharing data that may be considered proprietary or confidential.

Client model learning program 400 prepends the respective client's feature mapper to the received augmented model (step 470). Client model learning program 400 prepends the feature mapper previously trained by client model learning program 400 operating on the respective client computing device, such as client 1 computing device 120. Client model learning program 400 applies local feature data of the client's asset to the feature mapper prepended to the augmented model to obtain more accurate model output.

For example, client model learning program 400 prepends the previously trained feature mapper of the respective client to the received augmented model and applies the feature data of the client's asset to the feature mapper, such as vibration data and sound amplitude and frequency data. The vibration data and sound amplitude and frequency data of the asset were captured locally since the installation of the asset. Client model learning program 400 applies the vibration data feature and the sound amplitude and frequency data feature of the asset to the feature mapper and receives a more accurate output of the state or condition of the asset. The combination of the feature mapper and the augmented model provides a more accurate, and still private model that the client can use, without having to surrender or share client asset feature data. Having provided the augmented model to participating clients as an improved, more accurate model for assets of the asset group, client model learning program 400 ends.

Figure 5:
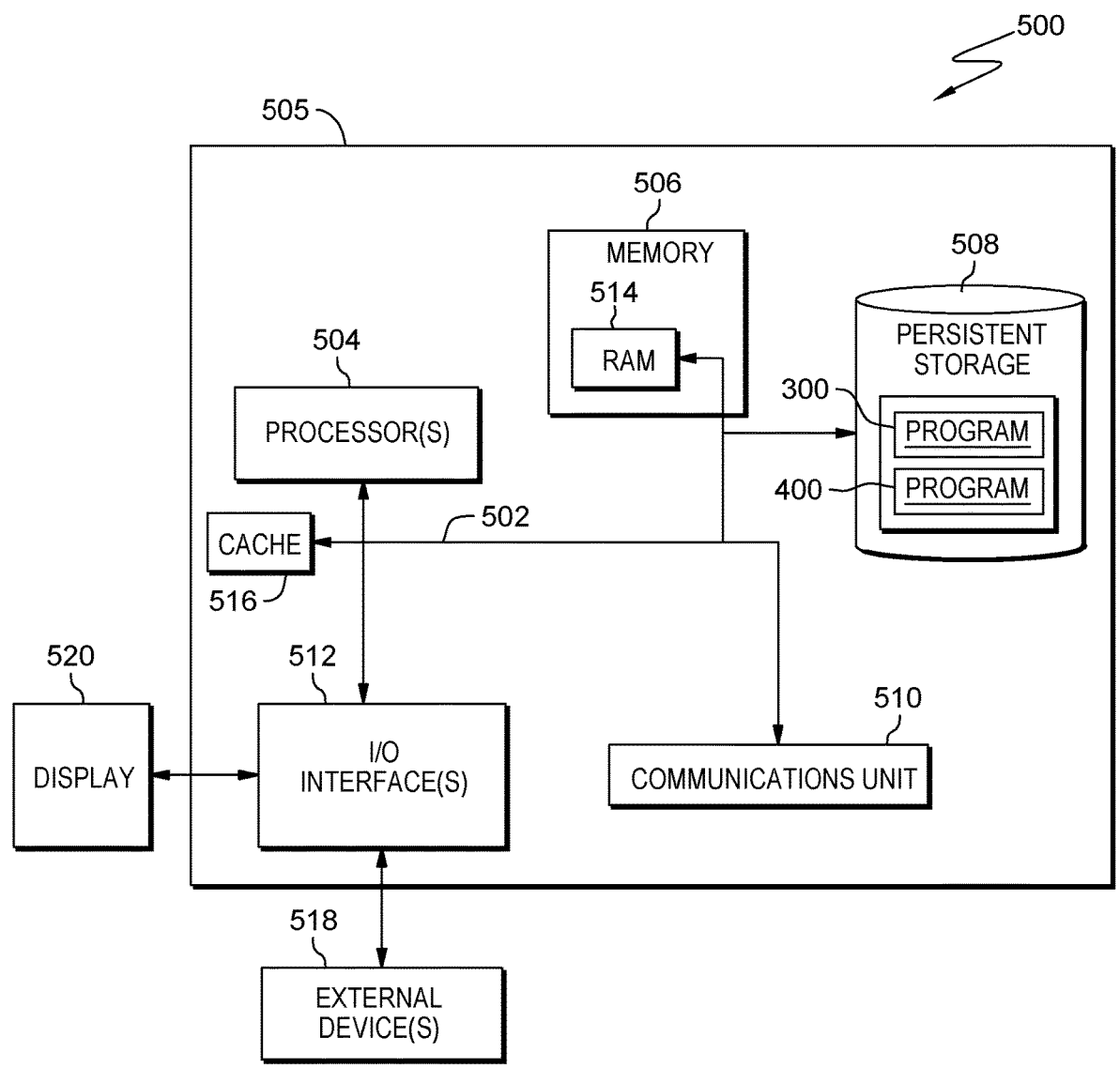
FIG. 5 depicts a block diagram of components of a computing system, including a computing device configured to operationally perform the model federation program of FIG. 3 and the client model learning program of FIG. 4, in accordance with an embodiment of the present invention.

FIG. 5 depicts a block diagram of components of computing system 500, including computing device 505, configured to include or operationally connect to components depicted in FIG. 1, and with the capability to operationally perform model augmentation program 300 of FIG. 3 and client model learning program 400 of FIG. 4, in accordance with an embodiment of the present invention.

Computing device 505 includes components and functional capability similar to components of model augmentation server 110 and mobile client 1 computing device 120, client 2 computing device 130, and client N computing device 140 (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, an input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506, cache memory 516, and persistent storage 508 are computer-readable storage media. In this embodiment, memory 506 includes random access memory (RAM) 514. In general, memory 506 can include any suitable volatile or non-volatile computer-readable storage media.

In one embodiment, model augmentation program 300 and client model learning program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Model augmentation program 300 and client model learning program 400 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., model augmentation program 300 and client model learning program 400 can be stored on such portable computer-readable storage media and can be loaded onto persistent storage 508 via I/O interface(s) 512. I/O interface(s) 512 also connects to a display 520.

Display 520 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating an artificial intelligence (AI) model, the method comprising:
    receiving, by one or more processors, information associated with respective existing models from a plurality of clients;
    grouping, by the one or more processors, the respective existing models from the plurality of clients into domains based on the received information of the respective existing models;
    sending, by the one or more processors, a seed model to a first set of clients of the plurality of clients that correspond to existing models that are grouped into a first domain;
    receiving, by the one or more processors, confirmation of mapping feature data of the respective existing models of the first set of clients to a canonical schema of the seed model;
    sending, by the one or more processors, a base model with the canonical schema associated with the seed model, respectively, to the first set of clients;
    receiving, by the one or more processors, from the first set of clients, respectively, the base model that is trained by the feature data of the respective existing models of the first set of clients; and
    generating, by the one or more processors, an augmented model by federation of attributes from the received base models of the first set of clients, trained by the feature data of the respective existing models of the first set of clients.

2. The method of claim 1, further comprising:
    sending, by the one or more processors, the augmented model to respective clients of the first set of clients, wherein a feature mapper of the respective clients of the first set of clients is prepended to the augmented model.

3. The method of claim 1, wherein the feature data of respective clients of the first set of clients is private data that is unshared, remains with a respective client, and is used by the respective client to generate the feature mapper with the seed model and to train the base model.

4. The method of claim 1, wherein the mapping of the feature data of the existing model of a respective client to the canonical schema, further comprises:
    generating, by the one or more processors, an algorithm to translate a feature of the existing model of the respective client to the canonical schema of the seed model; and
    applying, by the one or more processors, the feature data of a respective client's asset to the algorithm transforming the feature data to an input feature of the canonical schema of the augmented model.

5. The method of claim 1, wherein generating the augmented model further comprises:
    performing, by the one or more processors, learning federation techniques on the received trained base models from the respective clients; and
    generating, by the one or more processors, a single augmented model including attributes of the base model that is trained and received, respectively, from the first set of clients.

6. The method of claim 1, wherein the canonical schema of the seed model and the base model include one or more input features and at least one output feature.

7. The method of claim 1, wherein a domain of the respective existing models includes models performing similar types of analysis.

8. A method for improving a model based on augmenting a plurality of models trained on private feature data, the method comprising:
    receiving, by one or more processors, an assignment of a domain for an existing model of a model type;
    receiving, by the one or more processors, a seed model that includes a canonical schema associated with the domain of the existing model;
    training, by the one or more processors, the seed model by generating a feature mapper that maps private feature data of the existing model to the canonical schema of the seed model;
    confirming, by the one or more processors, completion of mapping of the private feature data of the existing model to the canonical schema of the seed model;
    receiving, by the one or more processors, a base model including the canonical schema of the seed model;
    training, by the one or more processors, the base model by applying the private feature data of the existing model to the canonical schema of inputs by use of the feature mapper;
    sending, by the one or more processors, the base model that is trained to a model augmentation service, wherein the model augmentation service generates an augmented model by applying federated learning to a plurality of received base models; and
    prepending, by the one or more processors, the feature mapper to the augmented base model received from the model augmentation service, wherein the private feature data of the existing model is applied to the feature mapper.

9. The method of claim 8, wherein the plurality of received base models are trained, respectively, by a set of clients applying the private feature data of the respective existing models of the set of clients to the canonical schema of the received base models by use of the feature mappers generated, respectively, by the set of clients.

10. The method of claim 8, wherein the seed model that is received includes rules facilitating the mapping of the private feature data of the existing model to the canonical schema of the seed model.

11. The method of claim 8, wherein the mapping of the feature data of the existing model to the canonical schema of the seed model, further comprises:
    generating, by the one or more processors, an algorithm to translate a feature of the existing model to the canonical schema of the seed model; and
    applying, by the one or more processors, the feature data of a client's asset to the algorithm transforming the feature data to an input feature of the canonical schema of the augmented model.

12. The method of claim 8, wherein the feature data that is private is unshared, remains with a respective client, and is used by the respective client to generate the feature mapper with the seed model and train the base model.

13. A computer system for generating an artificial intelligence (AI) model, the method comprising:
    one or more computer processors;
    one or more computer readable storage media; and
    program instructions stored on the one or more computer readable storage media, the program instructions comprising:
        program instructions to receive information associated with respective existing models from a plurality of clients;

program instructions to group the respective existing models from the plurality of clients into domains based on the received information of the respective existing models;
program instructions to send a seed model to a first set of clients of the plurality of clients that correspond to existing models that are grouped into a first domain;
program instructions to receive confirmation of mapping feature data of the respective existing models of the first set of clients to a canonical schema of the seed model;
program instructions to send a base model with the canonical schema associated with the seed model, respectively, to the first set of clients;
program instructions to receive from the first set of clients, respectively, the base model that is trained by the feature data of the respective existing models of the first set of clients; and
program instructions to generate an augmented model by combination of attributes from the received base models of respective clients, trained by the feature data of the respective existing models of the first set of clients.

14. The computer system of claim 13, further comprising program instructions, stored on the one or more computer readable storage media for execution by at least one of the one or more processors, to:
send the augmented model to the respective clients of the first set of clients, wherein the feature mapper of the respective clients is prepended to the augmented model.

15. The computer system of claim 13, wherein the feature data of the respective clients of the first set of clients is private data that is unshared and remains with the respective client.

16. The computer system of claim 13, wherein the mapping of the feature data of the existing model of the respective client to the canonical schema, further comprises program instructions, stored on the one or more computer readable storage media, to:
generate an algorithm to translate a feature of the existing model of the respective client to the canonical schema of the seed model; and
apply the feature data of a respective client's asset to the algorithm transforming the feature data to an input feature of the canonical schema of the augmented model.

17. The computer system of claim 13, wherein program instructions to generate the augmented model further comprises program instructions, stored on the one or more computer readable storage media for execution by at least one of the one or more processors, to:
perform learning federation techniques on the base model that is trained, received from the first set of clients, respectively; and
generate a single augmented model including attributes of the base models that are trained, and respectively received from the first set of clients.

18. The computer system of claim 13, wherein the canonical schema of the seed model and the base model include one or more input features and at least one output feature.

19. The computer system of claim 13, wherein the canonical features of the seed model and the base model include input features and at least one output.

20. The computer system of claim 13, wherein a domain of the respective existing models includes models performing similar types of analysis.

* * * * *